Feb. 16, 1965 M. L. ABEL ETAL 3,169,807
AIR BEARING
Filed June 28, 1962
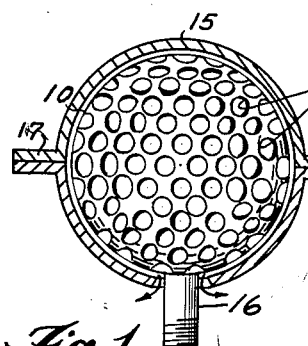
Fig.1.
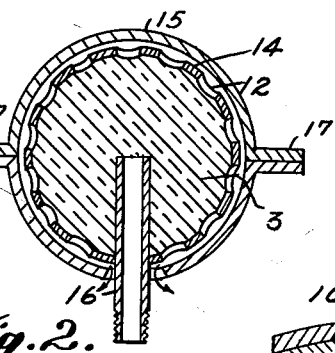
Fig.2.
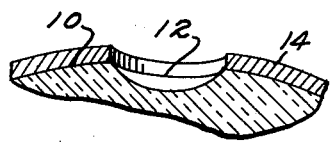
Fig.3.
Fig.4.
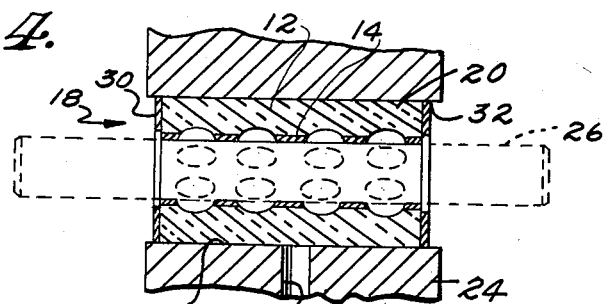
Fig.5.
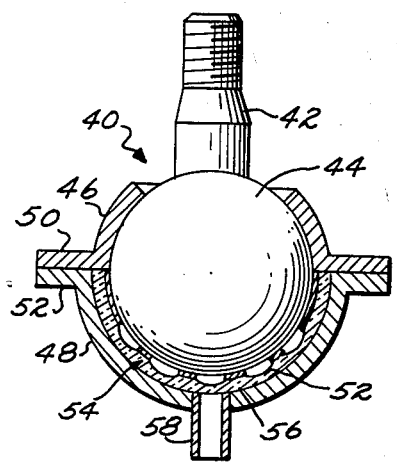
Fig.6.
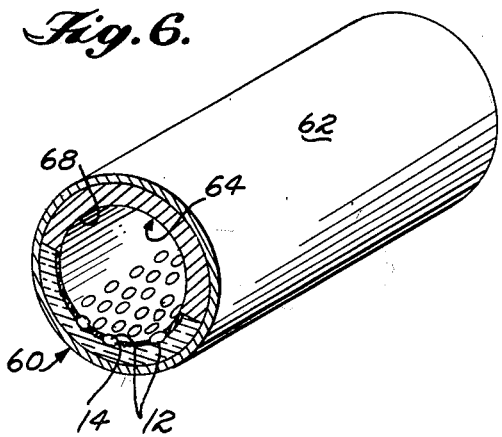
INVENTORS
MARTIN L. ABEL
BY DAVID TANN
Lane & Aitken
ATTORNEYS United States Patent Office 3,169,807
Patented Feb. 16, 1965

3,169,807
AIR BEARING
Martin L. Abel, Oak Park, and David Tann, Detroit, Mich., assignors to Tann Corporation, Detroit, Mich., a corporation of Michigan
Filed June 28, 1962, Ser. No. 206,039
18 Claims. (Cl. 308—9)

The present invention relates to air bearings, and more particularly to an air bearing having a bearing surface with a plurality of dimples formed therein from which pressurized air can be ejected.

It is one object of the invention to provide an air bearing made from a porous body having a plurality of dimples on the bearing surface thereof (similar to the dimples in the surface of a golf ball) with the non-dimpled portion of the bearing surface being sealed off so that pressurized air can be introduced into the porous body and ejected from each of the dimples.

It is another object of the invention to provide an air bearing having a large number of dimples in the bearing surface thereof from which pressurized air can be ejected.

It is a further object of the invention to manufacture an air bearing of the type described above by forming a porous body having the dimples on the bearing surface thereof, and thereafter densifying or sealing off the non-dimpled portion of the bearing surface in a manner to cause pressurized air introduced within the body to be ejected from each of the dimples.

It is a still further object of the invention to provide an improved method for making an air bearing having a large number of small air ejection apertures on the bearing surface thereof.

It is a still further object of the invention to provide an air bearing having a porous body for distributing pressurized air to a plurality of dimples on the bearing surface thereof which cooperate with the surface of the member to be journaled by the bearing to form small pockets into which the pressurized air is ejected to build up the pressure for supporting the member on a cushion of air.

Other objects and features of novelty of the present invention will be specifically pointed out or will otherwise become apparent when referring, for a better understanding of the invention, to the following description taken in conjunction with the accompanying drawings, wherein:

FIG. 1 is a sectional view of structure illustrating features of the invention;

FIG. 2 is a sectional view similar to FIG. 1 with the ball also shown in section;

FIG. 3 is an enlarged fragmentary sectional view of the structure of FIG. 2 within the circle 3;

FIG. 4 is a fragmentary sectional view illustrating another embodiment of the invention;

FIG. 5 is a sectional view illustrating still another embodiment of the invention; and FIG. 6 is a sectional view illustrating still another embodiment of the invention.

Referring to FIGS. 1–3, a spherical body 10 is illustrated which embodies features of the invention. It is made of a suitable porous material that will pass air therethrough such as, for example, a sintered bearing material, a hardened porous resin material, or a new metal appearing on the market made up from metal fibers welded together under heat and pressure to form bodies of any desired porosity. The body 10 is similar to a golf ball and has a plurality of substantially semi-spherical dimples 12 in the surface thereof. The non-dimpled portion of the surface of the ball is provided with a densified layer 14 to seal this portion of the surface off so that a suitable pressurized gas such as air, for example, can be introduced into the porous body 10 through a suitable fitting 16, for example, and ejected from the spherical surface of the body through the dimples 12. Thus with a very simple dimpled construction a plurality of apertures is provided on the surface of the porous body 10 from which pressurized air can be ejected to enable the body to be used as an air bearing, as will be described.

The densified layer 14 can be formed in a number of ways. For example a sealing material can be coated on the non-dimpled portion of the spherical surface or impregnated therein to seal off this portion so that the pressurized air introduced into the body by the fitting 16 will be directed outwardly through the dimples 12. A number of different materials can be used for sealing the non-dimpled portion in this manner, including epoxy resins, low friction resins such as nylon and Teflon, and/or suitable bearing metals, the latter preferably being heated to flow over the surface and then solidified thereon. This densified layer also can be very quickly and advantageously formed by merely applying heat and pressure to the surface of the ball to densify the non-dimpled portion thereof to a depth less than the depth of the dimples 12 so as not to seal them off.

As further illustrated in FIGS. 1 and 2, the spherical body 10 can be positioned within a socket 15 having flanges 17 projecting laterally therefrom. The body 10 can be fixed by means of the fitting 18 so that when pressurized air is introduced through the fitting and ejected from the dimples 12 the socket 15 will be supported on a cushion of pressurized air for limited universal movement relative to the body 10. The clearance between the socket 15 and the body 10 is empirically determined so that the socket functions as an air cap to maintain the desired air pressure with the air escaping at the throat of the socket.

Referring to FIG. 4, an air bearing 18 is illustrated embodying the features described above in connection with FIGS. 1–3. It comprises a bushing 20 made of a conventional sintered bearing material porous enough to transmit air therethrough and having the dimples 12 on the inner cylindrical surface thereof. In this embodiment the densified layer 14 is formed by applying heat and pressure to the inner cylindrical bearing surface to densify the non-dimpled portion thereof.

The bearing 18 is positioned within a bore 22 in a supporting member 24 so that a shaft 26 can be journaled therein on a cushion of pressurized air introduced into the bushing 20 through one or more passageways 28 in the member 24 and ejected from the plurality of dimples 12 on the bearing surface of the bushing. The substantially semi-spherical dimples 12 which decrease in cross-sectional area inwardly of the bearing surface of the bushing 20 form highly advantageous pockets into which the pressurized air from the bushing 20 can be ejected to build up pressure for rotatably journaling the shaft 26 on air. This pocket construction is far more effective than a construction wherein the pressurized air is ejected from a smooth, uninterrupted bearing surface. If desired, the ends of the bushing 20 can also be sealed off in a suitable manner such as by extending the densified layer 14 thereover or by tightly securing washer-shaped seals 30 and 32 thereagainst. This prevents air from escaping from the ends of the bushing and forces all of the air to be ejected from the dimples 12. Thus by the very simple expedient of providing a porous body with a dimpled bearing surface and thereafter densifying the non-dimpled portion of the bearing surface, a very effective and advantageous air bearing is provided. If desired the porous body can be molded, as conventional sintered bearings are molded, with the dimples formed directly therein.

Referring to FIG. 5, another embodiment of the invention is illustrated in the form of a dome loaded ball joint 40 comprising a stud 42 having a ball 44 on the end thereof journaled in a socket made from two metal stampings 46 and 48 having laterally projecting flanges 50 and 52 suitably secured together. The internal radius of the stamping 48 is greater than that of the stamping 46 to enable a bearing shell 54 to be fitted therein about the dome of the ball 44. The bearing shell 54 comprises a porous body 56 having the densified layer 14 with the dimples 12 on the inner spherical bearing surface thereof. Pressurized air is introduced into the porous body 56 through a fitting 58 projecting through the dome of the stamping 48 so that the air can be ejected through the dimples 12 as previously described to provide a cushion of air for journaling the ball 44.

Referring to FIG. 6, another embodiment of the invention is shown in the form of a bushing 60 comprising an outer cylindrical sleeve 62 preferably made of metal having a cylindrical bearing liner 64 therein split longitudinally into two parts. The lower part 66 of the bearing liner 64 is made of the porous material described above having the densified layer 14 and the dimples 12 on the bearing surface thereof. The upper part 68 of the liner is made of a conventional bearing material such as metal coated with molybdenum-disulphide on the bearing surface thereof. With this construction a shaft can be rotably journaled in the bushing 60 with the part 66 thereof aligned according to the direction of loading of the shaft. For example, if the shaft is a downwardly loaded, horizontally disposed shaft, the bushing 60 would be oriented as illustrated so that the dimpled portion of the part 66 would be at the area of maximum loading between the shaft and the bushing. The sleeve 62 is provided with an aperture (not shown) for introducing pressurized air into the porous part 66 and out through the dimples 12 to form the cushion of air beneath the shaft. If desired the dimpled portion of the densified layer 14 need not extend to the longitudinal side edges thereof but may be spaced therefrom as illustrated in FIG. 6.

While it will be apparent that the embodiments of the invention herein disclosed are well calculated to fulfill the objects of the invention, it will be appreciated that the invention is susceptible to modification, variation and change without departing from the proper scope or fair meaning of the subjoined claims.

What is claimed is:

1. An air bearing comprising a porous body having a dimpled bearing surface, the non-dimpled portion of said bearing surface being sealed off whereby pressurized air introduced into said porous body will pass therethrough and be ejected from said bearing surface through said dimples thereon.

2. The invention as defined in claim 1 wherein said porous body is made of sintered bearing material.

3. An air bearing comprising a porous body having a bearing surface formed by a layer which is denser than said porous body, said bearing surface having a plurality of dimples therein deeper than the thickness of the layer, most of said dimples being completely surrounded by said layer whereby pressurized air can be introduced into said porous body and ejected from said bearing surface through said dimples.

4. The invention as defined in claim 3 wherein said layer is integral with and formed of the same material as said porous body.

5. An air bearing comprising a porous body having a dimpled bearing surface, the non-dimpled portion of said bearing surface being denser than the remainder of said body, most of the dimples being completely surrounded by the denser nondimpled portion of the bearing surface, and means for introducing pressurized air into said porous body so as to be ejected from said bearing surface through said dimples.

6. An air bearing comprising a porous body having a bearing surface formed by a layer which is denser than said porous body, said layer having a plurality of dimples therein sufficiently deep to penetrate the layer, most of said dimples being completely surrounded by said layer and means for introducing pressurized air into said porous body so as to be ejected from said bearing surface through said dimples.

7. An air bearing comprising a porous body having a bearing surface formed by a layer which is denser than said porous body, said bearing surface having a plurality of dimples therein sufficiently deep to completely penetrate the layer, most of said dimples being completely surrounded by said layer, the cross-sectional area of said dimples decreasing from the bearing surface inwardly.

8. The invention as defined in claim 7 wherein said dimples are substantially semi-spherical.

9. An air bearing comprising a porous bushing having an internal cylindrical bearing surface with a plurality of dimples therein, the non-dimpled portion of said bearing surface being sealed off whereby pressurized air can be introduced into said porous bushing and ejected from said bearing surface through said dimples.

10. The invention as defined in claim 9 wherein a cross-sectional area of said dimples decreases from said bearing surface inwardly.

11. The invention as defined in claim 9 wherein said dimples are substantially semi-spherical.

12. The invention as defined in claim 9 wherein said porous bushing is made of sintered material.

13. The invention as defined in claim 9 wherein the ends of said porous bushing are sealed off by a dense layer to prevent air from escaping therefrom.

14. An air bearing comprising a body having a bore therein, a bushing of porous material positioned within said bore and having a bearing surface with a plurality of dimples therein, the non-dimpled portion of said bearing surface being sealed off by a densified layer, and means for introducing pressurized air from said body into said porous brushing and out said bearing surface through said dimples.

15. A ball joint comprising a stud and ball, and a socket journaled about said ball, said socket having a shell of porous material extending over at least a portion of said ball and having a bearing surface engaging said portion of the surface of the ball, said bearing surface being formed by a layer which is denser than said porous shell and having a plurality of dimples therein deeper than the layer, and means for introducing pressurized air into said porous shell so that it is ejected from said bearing surface through said dimples to journal said ball on a cushion of air.

16. An air bearing comprising a bushing split longitudinally into two parts, one of said parts being made of a porous material having a plurality of dimples in the bearing surface thereof, the non-dimpled portions of the bearing surface of said one part being sealed off by a densified layer whereby a shaft can be journaled in said bushing and pressurized air introduced into said one part and ejected from the dimples on the bearing surface thereof to support the shaft on a cushion of air.

17. The invention as defined in claim 16 wherein each of said parts in semi-cylindrical, and including a sleeve surrounding said parts to hold them together.

18. An air bearing comprising a porous body having a dimpled bearing surface with the non-dimpled portion thereof being denser than the dimpled portion thereof, a movable member supported on said bearing surface, and means for introducing pressurized air into said porous body whereby said pressurized air is distributed through the body and ejected from said bearing surface through said dimples so as to support said member on a cushion of air.

References Cited in the file of this patent

UNITED STATES PATENTS

| | | |
|---|---|---|
| 2,093,800 | May | Sept. 21, 1937 |
| 2,615,760 | Wallace | Oct. 28, 1952 |
| 2,645,534 | Becker | July 14, 1953 |
| 2,683,636 | Wilcox | July 13, 1954 |
| 2,696,410 | Topanelian | Dec. 7, 1954 |
| 2,838,829 | Goss | June 17, 1958 |
| 2,855,249 | Gerard | Oct. 7, 1958 |
| 2,902,748 | Schaeffer | Sept. 8, 1959 |

UNITED STATES PATENT OFFICE
CERTIFICATE OF CORRECTION

Patent No. 3,169,807                          February 16, 1965

Martin L. Abel et al.

It is hereby certified that error appears in the above numbered patent requiring correction and that the said Letters Patent should read as corrected below.

Column 2, line 35, for "18" read -- 16 --; column 4, line 52, for "brushing" read -- bushing --.

Signed and sealed this 24th day of August 1965.

(SEAL)
Attest:

ERNEST W. SWIDER
Attesting Officer

EDWARD J. BRENNER
Commissioner of Patents